United States Patent
Janosi

[15] 3,678,779
[45] July 25, 1972

[54] VARIABLE RATIO BRAKE PEDAL

[72] Inventor: Francis L. Janosi, Dearborn Heights, Mich.

[73] Assignee: Ford Motor Company, Dearborn, Mich.

[22] Filed: Nov. 12, 1970

[21] Appl. No.: 88,773

[52] U.S. Cl. ................................................. 74/516, 74/518
[51] Int. Cl. .......................................................... G05g 1/04
[58] Field of Search ............................................. 74/516, 518

[56] References Cited

UNITED STATES PATENTS

| | | | |
|---|---|---|---|
| 1,928,083 | 9/1933 | Warren | 74/516 |
| 2,315,632 | 4/1943 | Martindill | 74/518 |
| 3,039,322 | 6/1962 | Powrie | 74/107 X |
| 1,848,896 | 3/1932 | Martindill | 74/518 |
| 2,834,184 | 5/1958 | Ingres | 74/518 X |

Primary Examiner—William F. O'Dea
Assistant Examiner—P. D. Ferguson
Attorney—John R. Faulkner and Clifford L. Sadler

[57] ABSTRACT

A variable ratio brake pedal assembly including a foot operated pedal lever, a brake applying means and an intermediate crescent-shaped lever interposed between the pedal lever and the brake applying device. The intermediate lever has cam surfaces that engage both the brake applying device and the foot operated pedal lever whereby a change in effective mechanical advantage ratio occurs as force is transmitted from the pedal lever through the intermediate lever to the brake applying device when the pedal lever pivots and the intermediate lever is angularly displaced.

7 Claims, 5 Drawing Figures

Patented July 25, 1972 3,678,779
2 Sheets-Sheet 1
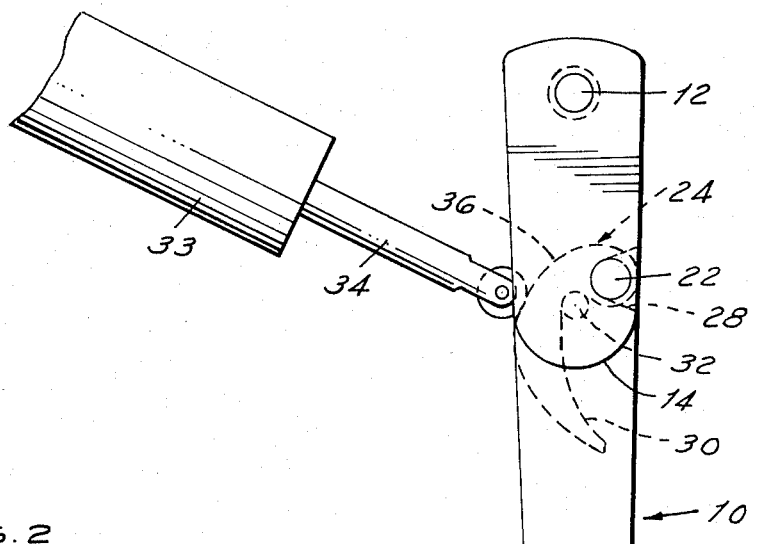
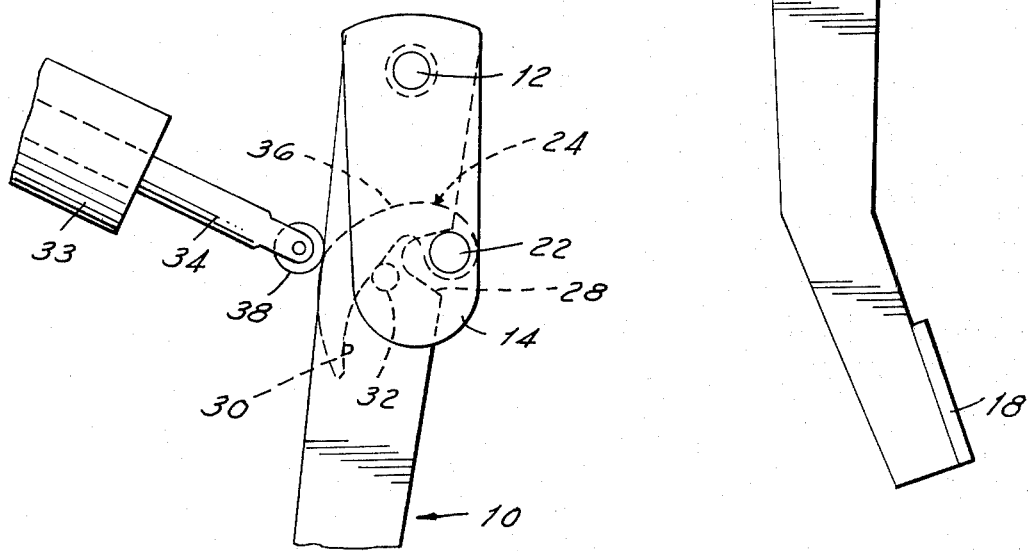
INVENTOR
FRANCIS L. JANOSI
BY John R. Paulkner
Clifford L. Sadler
ATTORNEYS Patented July 25, 1972

INVENTOR
FRANCIS L. JANOSI
BY John R. Faulkner
Clifford L. Sadler
ATTORNEYS

VARIABLE RATIO BRAKE PEDAL

BACKGROUND OF THE INVENTION

It is recognized as desirable to shorten the stroke of movement of the pedal that is used for applying the brakes of a motor vehicle. A brake pedal with a short stroke has the advantage that the brakes can be applied more quickly. A shorter stroke of movement of the pedal will allow the brake pedal to be placed more on a plane with the accelerator pedal so that the vehicle operator can shift his foot quickly from one pedal to the other thereby reducing reaction time during acceleration and braking.

With the brake system of the average motor vehicle there is a certain amount of lost motion that occurs in merely moving the brake shoes from their retracted position into initial contact with the brake drum. A part of the brake pedal movement is used in merely taking up the normal slack in the brake system. Relatively low efforts are required by the vehicle operator to move the brake pedal through this initial phase prior to the actual brake application.

It is an object of this invention, therefore, to provide a brake pedal system for applying the brakes of a vehicle wherein the pedal system effects a rapid movement of the brake shoe assemblies into engagement with the brake drum on a relatively short stroke of the brake pedal and at an effective mechanical advantage ratio that is lower than is desired for high pressure brake application.

It is also an object of the invention to provide a brake applying lever system that accomplishes the foregoing object and wherein the effective mechanical advantage ratio is increased when the brake shoe assemblies engage the brake drum thereby providing a greater force to "set" or apply the brakes with a lower effort requirement on the part of the operator of the vehicle.

BRIEF SUMMARY OF THE DISCLOSURE

In the presently preferred embodiment of this invention a brake pedal is suspended at its upper end and forms a second class lever. A crescent-shaped intermediate lever that is pivotally supported at one end engages the brake pedal and transfers applying forces therefrom to a brake actuator such as the input push rod of a brake master cylinder. The intermediate lever has a cam surface that engages a portion of the pedal lever. The intermediate lever also has a cam surface that engages the master cylinder push rod.

The cam surfaces of the intermediate lever are constructed and arranged whereby initial movement of the brake pedal will transmit a force through the intermediate lever to the push rod at an effective mechanical advantage ratio of moderate amount. As the angular displacement of the brake pedal increases there will be a corresponding increase in effective mechanical advantage ratio. The increase in ratio occurs as the pedal portion moves along the cam surface of the intermediate lever and similarly as the second cam surface of the intermediate lever moves in engagement with the push rod of the master cylinder.

With this construction, brake pedal movement will cause initial displacement of brake system components at a low effective mechanical advantage ratio and at an increased effective mechanical advantage ratio (with a corresponding increase in brake applying force) after the slack in the system has been taken up and the shoes are in engagement with the brake drums.

BRIEF DESCRIPTION OF THE DRAWINGS

The many objects and advantages of the present invention will become apparent from the following detailed description and the accompanying drawings wherein a preferred form of the invention is clearly shown.

In the drawings:

FIG. 1 discloses a side elevational view of a brake pedal system constructed in accordance with this invention, the lever being shown in the normal brake released position;

FIG. 2 is a side elevational view of the brake system of FIG. 1 showing the brake pedal displaced to a position corresponding to initial engagement of the brake shoes with the brake drum;

DETAILED DESCRIPTION OF A PREFERRED EMBODIMENT

Figure 3:
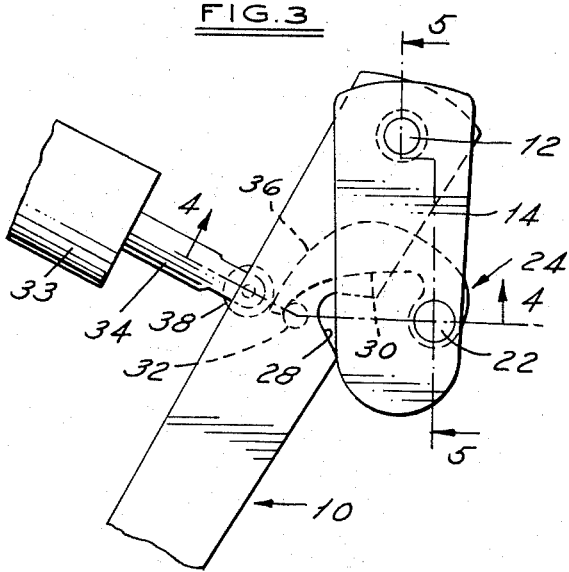
FIG. 3 is a side elevational view of the brake pedal system showing the pedal and related components displaced to a position corresponding to full brake application.
Figure 4:
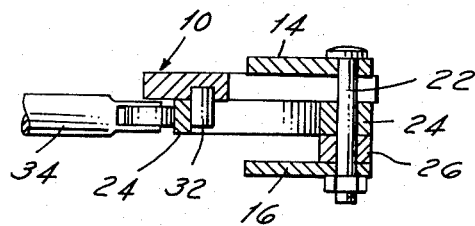
FIG. 4 is a sectional view taken along section lines 4—4 of FIG. 3.
Figure 5:
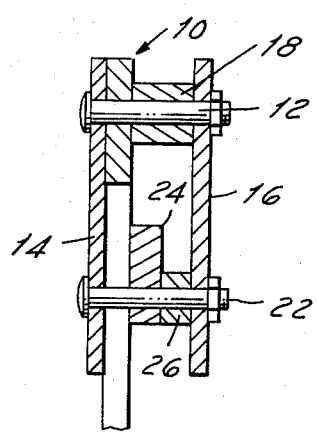
FIG. 5 is a sectional view taken along section lines 5—5 of FIG. 3.

Referring now to the drawings, wherein the presently preferred embodiment of this invention is illustrated, FIG. 1 discloses a brake pedal 10 that is pivotally supported at its upper end by a stationary pivot pin 12. The pivot pin 12 is supported by vehicle body structure which includes a pair of bracket members 14 and 16. The lower end of the pedal 10 has a pedal pad 18 secured thereto for engagement by the foot of the vehicle operator. The pedal 10 is shown in FIG. 1 in its retracted or "at rest" position.

The pedal 10 is positioned against the bracket element 14 and spaced from the bracket 16 by a cylindrical spacer 18. The spacer 18 surrounds the pivot pin 12 and is interposed between the pedal lever 10 and the bracket 16.

A pivot pin 22 extends between the brackets 14 and 16. It is arranged parallel to the pivot pin 12 and is spaced downwardly therefrom. A cam lever 24 has a generally elongated or crescent shape with one end pivotally supported on the pivot pin 22. The cam lever 24 is spaced from the bracket 16 by a cylindrical spacer 26 and from the bracket 14 by the pedal lever 10.

The pedal lever 10 has a notch or cut-out portion 28 in alignment with the pivot pin 22. The cut-out 28 permits the pedal lever 10 to be placed in the retracted position of FIG. 1. When the several components of the pedal assembly are aligned as shown in FIG. 1, the pivot pin 22 is situated in the notch 28.

The cam lever 24 has a contoured cam surface 30. The lever 10 has a cam engaging dowel 32 secured thereto which is in sliding engagement with the surface 30 of the cam lever 28.

A brake master cylinder 33 is supported on vehicle body structure and is connected to the vehicle's hydraulic brake system. A push rod 34 extends from the master cylinder and is constructed to be translated along a linear path. Displacement of the push rod 34 causes the master cylinder 32 to convey hydraulic fluid under pressure to the wheel brakes of the vehicle.

The cam lever 24 has a second cam surface 36 spaced from the first cam surface 30. The end of the master cylinder push rod 34 is provided with a roller 38 that functions as a cam follower. Spring means within the master cylinder 32 urges the push rod 34 to the right as seen in FIGS. 1, 2, 3 and 4 and the roller 38 into engagement with the cam surface 36.

OPERATION OF THE PREFERRED EMBODIMENT

As seen in FIGS. 1, 2 and 3, the dowel 32 of the brake pedal lever 10 is spaced from the roller 38 on the end of the push rod 34 with the cam lever 24 being interposed between the dowel and roller. The cam 24 functions to transmit brake applying force from the pedal lever 10 to the push rod 34. Due to the configuration of the cam surfaces 30 and 36, the cam lever 24 controls the spacing between pedal dowel 32 and roller 38.

In FIG 1, the various elements of the brake pedal systems are shown in fully retracted position. When the operator of the vehicle presses the pedal pad 18, the lever 10 will swing clockwise about the pin 22. When the cam lever 24 moves in a clockwise direction, the cam follower 38 and push rod 34 will be displaced to the left causing actuation of the master cylinder 32 and the vehicle brake system.

The spacing between the cam surfaces 30 and 36 controls the spacing of the dowel 32 and the cam follower 38. The surfaces 30 and 36 are contoured so that this space increases during the initial movement of the brake pedal 10. As seen in FIG. 2, the follower 38 and dowel 36 are spaced by an amount equal to the maximum thickness of the cam lever 24. Thus, as the pedal lever 10 moves from its FIG. 1 to FIG. 2 position the master cylinder push rod 34 will be displaced by a greater amount than if it had been directly connected to the pedal lever 10. This produces a reduction in the effective mechanical advantage ratio of the brake pedal 10.

By displacing the several components of the brake pedal system from their FIG. 1 orientation to their FIG. 2 position, the brake master cylinder 33 is actuated. In moving to the FIG. 2 position, the master cylinder 33 causes the shoes at the wheel brakes to be displaced from their retracted position into initial contact with their respective brake drums.

As the brake pedal 10 moves from its FIG. 2 to its FIG. 3 position, the relative displacement between the pedal lever dowel 32 and the cam follower 38 will be decreased by an amount corresponding to the reduction in thickness of the cam lever 34 between its midpoint and its free end. Thus, displacement of the brake lever 10 from the FIG. 2 position (where the brake shoes are in initial contact with the drums) to the FIG. 3 position (where the shoes are in full braking engagement with the drums), the push rod 34 will be displaced by an amount less than its displacement if it had been directly connected to the lever 10. This produces an increase in effective mechanical advantage ratio for the brake pedal system.

SUMMARY

In summary, the brake system of the present invention provides an arrangement whereby initial movement of the brake pedal 10 will be at a low effective mechanical advantage ratio. With a lower effective ratio, a less than normal initial displacement of the brake pedal will produce substantial movement of the brake components to take up any slack or lost motion in the system. Subsequent brake pedal movement will be at a higher effective ratio whereby an increase in brake shoe applying force will occur for the same force at the brake pedal pad 18.

The configuration of the cam surfaces 30 and 36 can be designed to provide a reduction in total pedal travel by decreasing the initial phase of the brake pedal travel.

The foregoing description presents the presently preferred embodiment of this invention. Modification and alterations may occur to those skilled in the art which will come within the scope and spirit of the following claims.

I claim:

1. A variable ratio brake pedal assembly comprising a foot operated pedal lever, a brake applying device, said lever being pivotally supported for angular displacement, said device having a linearly movable actuator spaced from said lever, crescent-shaped cam means interposed between said pedal lever and said actuator, said crescent-shaped cam means being constructed for translating angular displacement of said lever to linear displacement of said actuator, said crescent-shaped cam means having first and second contoured surfaces, said pedal lever having a portion engaging said first surface, said actuator having a portion engaging said second surface, said pedal lever portion being linearly displaced with respect to said first surface and said actuator portion being linearly displaced with respect to said second surface upon angular displacement of said pedal lever, said crescent-shaped cam means being constructed to provide a progressive change in the effective mechanical advantage ratio of said brake pedal assembly by changing the spacing between said lever and said actuator in response to the angular displacement of said lever as said pedal lever is displaced from its retracted position to its brake applied position.

2. A variable ratio brake pedal assembly according to claim 1 and including:
said crescent-shaped cam means being pivotally supported by one of its ends.

3. A variable ratio brake pedal assembly according to claim 1 and including:
said crescent-shaped cam means being constructed to provide a decrease in effective mechanical advantage ratio of said pedal lever upon displacement of said pedal lever from a brakes-released position to an intermediate position, said cam means being further constructed to provide an increase in effective mechanical advantage ratio of said pedal lever upon displacement of said pedal lever from said intermediate position to a brakes-applied position.

4. A variable ratio brake pedal assembly comprising a foot operated pedal lever, a brake applying device, said lever being pivotally supported for angular displacement, said device having a linearly movable actuator spaced from said pedal, an elongated cam operatively interposed between said pedal lever and said actuator, said cam being pivotally supported and having a first contoured cam surface engaging said lever and a second contoured cam surface engaging said actuator, said cam being constructed for translating angular displacement of said lever to linear displacement of said actuator, said cam being constructed to provide a progressive change in the spacing between said actuator and said pedal lever in response to the angular displacement of said lever as said pedal lever is displaced from its retracted position to its brake applying position, said cam being constructed to increase the spacing between said pedal lever and said actuator during the initial movement of said pedal lever from its retracted position and thereby decrease the effective mechanical advantage ratio of said pedal lever during said initial movement.

5. A variable ratio brake pedal assembly according to claim 4 and including:
said cam being further constructed to decrease the spacing between said pedal lever and said actuator during the final phase of the movement of said pedal lever.

6. A variable ratio brake pedal assembly comprising a foot operated pedal lever, a brake applying device, said lever being pivotally supported for angular displacement, said device having a linearly movable actuator, an elongated intermediate cam means pivotally supported at one end, said intermediate lever means having a first cam surface engaging said pedal lever and a second cam surface engaging said actuator, said intermediate cam means being constructed for translating angular displacement of said pedal lever to linear displacement of said actuator, said intermediate cam means being constructed to provide a decrease in effective mechanical advantage ratio of said pedal lever upon displacement of said pedal lever from a brake-released position to an intermediate position, said cam means being further constructed to provide an increase in effective mechanical advantage ratio of said pedal lever upon displacement of said pedal lever from said intermediate position to a brake applied position.

7. A variable ratio brake pedal assembly according to claim 6 and including:
said pedal lever having cam follower means engaging said first cam surface, said actuator having cam follower means engaging said second cam surface.

* * * * *